Aug. 26, 1969   H. P. O. LUNDSTRÖM ET AL   3,463,270
LUBRICATING MEANS FOR ROLLER DRILL BIT
Filed Feb. 17, 1967

INVENTOR
Hans Per Olof Lundström
Ole Hilding Herrgård

United States Patent Office 3,463,270
Patented Aug. 26, 1969

3,463,270
LUBRICATING MEANS FOR ROLLER DRILL BIT
Hans Per Olof Lundstrom and Ole Hilding Herrgard, Sandviken, Sweden, assignors to Sandvikens Jernverks Aktiebolag, Sandviken, Sweden, a corporation of Sweden
Filed Feb. 17, 1967, Ser. No. 616,946
Claims priority, application Sweden, Feb. 23, 1966, 2,314/66
Int. Cl. F16n *11/10;* E21b *9/08;* B65d *35/04*
U.S. Cl. 184—39         1 Claim

ABSTRACT OF THE DISCLOSURE

For lubricating a bearing of a roller of a roller drill bit a container for lubricant under controlled pressure is arranged in the holder of the bit, with a channel communicating between the container and the bearing. Flow of lubricant from container to bearing is effected through a ball valve in said channel and actuated by an eccentric carried on the roller.

---

A roller drill bit comprises a holder on which rollers are journalled provided with cutting teeth. The rollers rotate during the drilling, and their bearings are subjected to a high pressure in both axial and radial directions. Hence it is desirable to provide sufficient lubrications in order to prevent damage to the bearings. As the bit during drilling is situated at the bottom of the drill hole, it is not accessible for continuous inspection and manual lubricating of the rollers, and in order to ensure a continuous lubrication, an automatic device has to be used for supplying a lubricant. Different prior means for this purpose have been suggested comprising a pressure container for feeding the lubricant under pressure to the bearings. A substantial difficulty with the prior devices is that they have insufficient means for regulating the feed of the lubricant from the pressure container to the bearings. Usually the feed is determined only by the width of the supply channel, which, however, is insufficient for determining the desired feed rate.

The present invention provides an improvement in this regard by control means governed by the motion of the rollers, which renders the feed more reliable and precise.

Particulars of the invention and the advantages gained thereby appear from the following specification with appended drawings showing:

Figure 1:
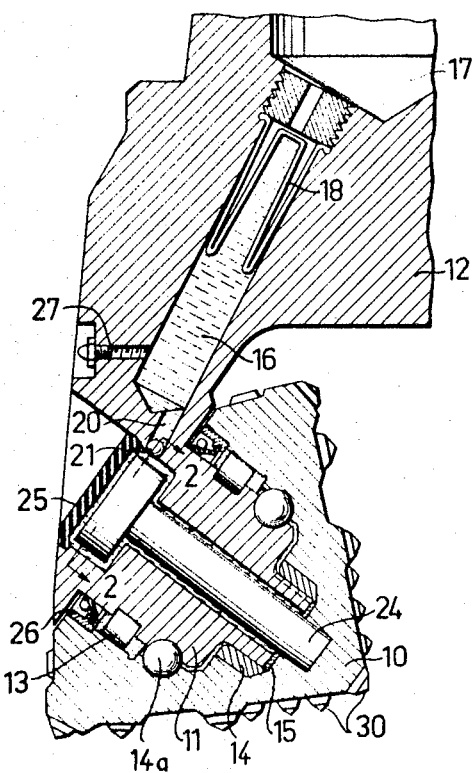
FIG. 1 is a vertical sectional view through a part of a drill bit with a roller and a lubricating device.

The roller 10 in FIG. 1 is journalled on a lug 11 projecting from the holder 12, of which a portion is shown. The roller has cutter teeth 30 which either may be separate and fastened by brazing in the roller or integral with the roller. Separate cutter teeth are usually made of sintered carbide. The bearings comprise radial bearings 13 and 14 and an axial bearing 15. Balls 14a serve to hold the roller on the lug 11.

For supplying a lubricant to the roller there is a lubricant container 16 arranged, formed by a bore in the holder. The lower end of the container 16 communicates with the bearings for supply of the lubricant, and the upper end is provided with a pressure device for communicating pressure from the flushing channel 17 to the lubricant.

As usual in these drills there is a flushing channel 17 along the central part of the drill rod for providing a flushing medium—usually water or air—under pressure to the drill bit for removal of the cuttings. The illustrated drill comprises a device for transferring the pressure of the flushing channel to the lubricant, said device consisting of a flexible, sleeve shaped partition 18, which separates the lubricant from the flushing medium, but transfers the pressure from the flushing medium to the lubricant. Instead of the illustrated flexible partition 18 it is possible to use some other pressure transferring device as a piston movable in the container 16. The pressure may also be obtained from some other source than the flushing channel as for instance from a spring biased piston.

Figure 2:
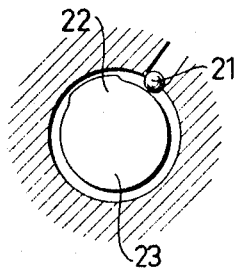
FIG. 2 is a detail section of the lubricating device on the line 2—2 in FIG. 1.

At the lower end of the lubricant container 16 there is a feed channel 20 leading from the container to the bearings. In this channel there is a ball valve 21, which under the pressure from the lubricant is biased towards a seat in the channel, thus closing the passage. For letting through lubricant from the container to the bearings, the ball valve is actuated by a cam 22 (FIG. 2) which is situated on a pin 23. The pin is fastened to the roller and rotates therewith.

For each turn of the roller, the cam 22 raises the ball valve 21 from its seat, letting through a quantity of lubricant. This quantity depends on the height and the length of the cam portion 22, which thus provides a possibility for a precise determining of the desired feed rate.

In previous lubrication devices, the feed rate is determined only by the cross section area of the supply channel 20, which makes the feed dependent upon the pressure and the viscosity of the lubricant, and thus the feed becomes unreliable. If in these prior devices the lubricant is put under a high pressure, the feed channel must have a narrow section in order not to have a too great feed rate. This implies the disadvantage that the viscosity of the lubricant has too much influence upon the feed rate.

In the present device the feed rate depends on the length and height of the cam 22, and the supply channel 20 can be relatively wide. Consequently the feed rate is more independent of the viscosity and pressure of the lubricant than in the prior devices. A high pressure can be used for securing a reliable flow of lubricant, the quantity being regulated by the properly adjusted valve 21. Hence, a suitable embodiment of the present invention is the one in which the flushing channel is used as a pressure source, because this gives a high pressure.

Instead of the illustrated ball valve some other type of valve, actuated by the roller, may be used, for instance a screw or a pinion valve.

At the bottom of the lubricant container 16 there is a refilling opening 27 closed by a screw.

There may be one common lubricant container for all the rollers on a drill bit or one container for each roller separately. The containers may as illustrated be made as a bore in the holder, but they may alternatively consist of separate containers attached to the holder.

The above described roller actuated lubricant feed device has several advantages over the prior art. There is no flow of lubricant except when the drill is in action. This means saving of lubricant and thus less frequent extraction of the drill from the hole for refilling of lubricant. Furthermore, the invention provides an accurate control of the feed rate of the lubricant. The pressure on the lubricant can be high, yet maintaining the said accurate control, thus ensuring a reliable feed of lubricant at the desired rate.

We claim:
1. Lubricating means for a roller drill bit comprising a holder, on which at least one roller with cutting teeth is journalled, said lubricating means comprising a lubricant container which communicates with the bearing of the roller for supply of a lubricant, pressure means for putting said lubricant under pressure, control means for determining the flow of lubricant from the container, and actuating means for actuating said control means by the rotation of the roller, said actuating means being an eccentric projection positioned on a pin rotating with said roller.

References Cited

UNITED STATES PATENTS

| 2,174,102 | 9/1939 | Catland | 175—229 X |
| 3,163,394 | 12/1964 | Downin | 251—259 X |

HOUSTON S. BELL, Jr., Primary Examiner

U.S. Cl. X.R.

175—228; 251—251; 308—8.2, 187